United States Patent
Raguin et al.

(10) Patent No.: US 10,530,212 B2
(45) Date of Patent: Jan. 7, 2020

(54) SCREWED STATOR FRAME FOR AN ELECTRIC MOTOR AND ASSOCIATED MANUFACTURING PROCESS

(71) Applicant: Alstom Transport Technologies, Saint-Ouen (FR)

(72) Inventors: Bruno Raguin, Ornans (FR); Jean-Pierre Lombard, Miserey-Salines (FR); Gaëtan Trimaille, Besancon (FR)

(73) Assignee: Alstom Transport Technologies, Saint-Ouen (FR)

( * ) Notice: Subject to any disclaimer, the term of this patent is extended or adjusted under 35 U.S.C. 154(b) by 111 days.

(21) Appl. No.: 15/655,313

(22) Filed: Jul. 20, 2017

(65) Prior Publication Data
US 2018/0026491 A1 Jan. 25, 2018

(30) Foreign Application Priority Data
Jul. 22, 2016 (FR) ...................... 16 57056

(51) Int. Cl.
| H02K 5/04 | (2006.01) |
| H02K 5/06 | (2006.01) |
| H02K 5/15 | (2006.01) |
| H02K 15/14 | (2006.01) |

(52) U.S. Cl.
CPC ............. *H02K 5/06* (2013.01); *H02K 5/15* (2013.01); *H02K 15/14* (2013.01)

(58) Field of Classification Search
CPC ............ H02K 15/14; H02K 5/15; H02K 5/06; H02K 5/04; H02K 1/185
See application file for complete search history.

(56) References Cited

U.S. PATENT DOCUMENTS

| 598,540 | A | | 8/1898 | Soames |
| 3,395,296 | A | | 7/1968 | Cohen |
| 5,387,080 | A | * | 2/1995 | Bouhennicha ........ F01D 17/162 415/150 |
| 6,879,067 | B1 | * | 4/2005 | Rockwell ............... H02K 33/04 310/12.04 |
| 2005/0035673 | A1 | | 2/2005 | Lafontaine et al. |
| 2006/0102697 | A1 | * | 5/2006 | Nagai ................. F16H 25/2021 228/101 |
| 2011/0031827 | A1 | * | 2/2011 | Gennesseaux ......... H02K 7/025 310/74 |

(Continued)

FOREIGN PATENT DOCUMENTS

| CN | 102052378 A | 5/2011 |
| DE | 10129172 A1 | 12/2002 |

(Continued)

OTHER PUBLICATIONS

Search Report dated Apr. 7, 2017, issued in corresponding French Application No. 1657056.

(Continued)

*Primary Examiner* — Naishadh N Desai
(74) *Attorney, Agent, or Firm* — Troutman Sanders LLP

(57) ABSTRACT

A motor stator frame including two plates in cast iron; at least one steel bar connecting both plates, each bar having two threaded ends; and at least one threaded bushing. Where each of the plates has at least one orifice being used as a seat for each threaded bushing the threaded ends of each bar being engaged into the threaded bushings.

10 Claims, 2 Drawing Sheets

(56) References Cited

U.S. PATENT DOCUMENTS

| | | |
|---|---|---|
| 2011/0031830 A1 | 2/2011 | Oleson et al. |
| 2013/0193784 A1* | 8/2013 | Zheng .................... H02K 5/15 |
| | | 310/51 |
| 2014/0035407 A1 | 2/2014 | Uryu et al. |

FOREIGN PATENT DOCUMENTS

| | | |
|---|---|---|
| FR | 2 944 654 A1 | 10/2010 |
| JP | 10225042 A | 8/1998 |

OTHER PUBLICATIONS

Search Report dated Nov. 23, 2017, issued in corresponding European Application No. 17 18 0708 (in French).

* cited by examiner

SCREWED STATOR FRAME FOR AN ELECTRIC MOTOR AND ASSOCIATED MANUFACTURING PROCESS

CROSS REFERENCE TO RELATED APPLICATIONS

The present application claims priority to French Application No. FR 16 57056 filed Jul. 22, 2016. This application is incorporated herein by reference in its entirety.

FIELD OF THE INVENTION

The present invention relates to a motor stator frame comprising two plates in cast iron and at least one steel bar connecting both plates, each bar having two threaded ends.

This stator frame is intended to receive a rotor of an electric motor, notably an electric motor participating in the propulsion of a railway vehicle.

BACKGROUND

A railway vehicle generally includes several motors of this type, positioned on the bogies and driving the wheels. To do this, the electric motors transform into a rotary movement an electric power produced by the generator of the vehicle or directly provided from a power supply cable.

These motors generally consist of a rotary portion, the rotor, and of a fixed portion the stator, attached in a frame, which plays a protection and insulation role and receives a circuit for cooling the motor.

The frame is a metal casing, generally in an iron alloy for maximum strength, for example in cast iron or in steel. Several methods for manufacturing such a motor frame are known.

A first method consists of molding the frame in a single part, generally in cast iron, which has advantages notably in terms of cost. Further, a frame in a single part is more rigid and solid. However, the thereby obtained structure is heavy and bulky.

In order to reduce the mass of the frame, the use of a structure in several parts welded to each other is known, notably comprising two end plates connected through parallel bars. In order to compensate for the lower resistance of such a structure, steel is generally used for its making, which substantially increases the manufacturing cost of the frame. Further, a frame consisting of several welded parts is more likely to undergo distortions under the effect of internal constraints generated by the cooling of the welding areas. These distortions may be passed onto the stator, which may be detrimental to proper operation of the electric motor by forming hot points or a magnetic unbalance.

An object of the invention is to provide a motor stator frame which is more resistant to distortions and less expensive, while retaining reduced bulkiness.

SUMMARY

For this purpose, the invention relates to a motor stator frame of the aforementioned type, characterized in that the frame further includes at least one threaded bushing and in that each of the plates comprises at least one orifice being used as a seat for each threaded bushing, the threaded ends of each bar being engaged into the threaded bushings.

Such a frame has advantages in terms of bulkiness relatively to the molded frame in cast iron, not being made in a single piece and thereby having a less massive structure. The frame is also less expensive than a frame made from steel parts welded together, since the most massive parts like the plates are made in cast iron.

According to particular examples, the motor stator frame according to the invention has one or several of the following features, taken individually or according to any technically possible combination:
  each orifice of each plate in cast iron is a through orifice and opens on an inner face and an outer face of the plate;
  each orifice includes an inner segment opening onto the inner face of the plate and an outer segment opening onto the outer face of the plate, the inner segment having a diameter of less than the diameter of the outer segment, and the threaded bushing engaged into the orifice has a complementary shoulder of the orifice;
  each threaded bushing is flushed with an outer face of the plate including the orifice;
  each end of each bar is flushed with the outer face; and
  each end of each bar has a threaded orifice receiving a screw for attaching an end flange.

The invention also relates to a method for manufacturing a frame, comprising the following steps:
  providing two plates in cast iron, having at least one orifice;
  providing at least one steel bar having two threaded ends;
  providing threaded bushings;
  inserting one of the threaded bushings in each orifice of each plate; and
  screwing each threaded end of each bar into one of the threaded bushings placed in one of the orifices of one of the plates.

According to particular embodiments, the method according to the invention has one or several of the following features, taken individually or according to any technically possible combination:
  the method comprises a step for piecing the outer face of each plate in order to form an outer segment at each orifice, said outer conduit being able to cooperate with a shoulder of each threaded bushing for maintaining said threaded bushing in place;
  the method comprises a step for leveling a tightening head of each threaded bushing so as to make the threaded bushing and the end of the bar flushed with the outer face of the plate; and
  the method comprises a step for piercing a threaded orifice for receiving an attachment screw of an end flange in each end of at least one bar.

BRIEF DESCRIPTION OF THE DRAWINGS

The invention will be better understood upon reading the description which follows, only given as an example and made with reference to the appended drawings, wherein.

DETAILED DESCRIPTION

Figure 1:
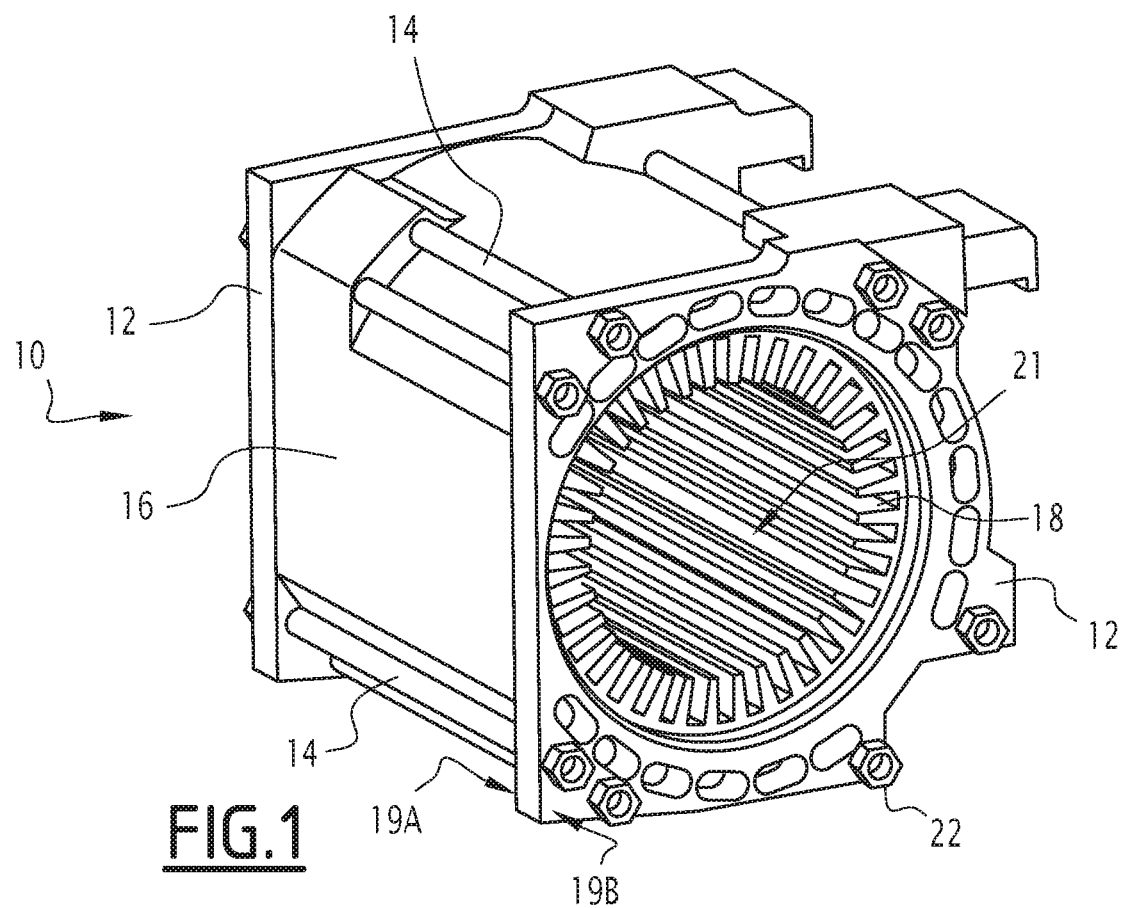
FIG. 1 is a perspective view of a motor stator frame according to the invention.

A motor stator frame 10, illustrated in FIG. 1, includes two substantially parallel plates 12 and at least one bar 14 connecting both plates 12. Advantageously, the frame 10 comprises side walls 16 assembled by clamping between two plates 12 and able to contain and protect a stator 18 of an electric motor.

The plates 12 are molded in cast iron and are substantially planar and have an inner face 19A and an outer face 19B. Both plates 12 further include at least one through-orifice 20. By through-orifice, is meant that each orifice 20 is open at both of its ends and opens onto the inner face 19A and onto the outer face 19B of the plate 12. Each plate 12 further includes a central aperture 21 generally circular, allowing the passage of the rotor in the frame 10.

Each orifice 20 is pierced in the plate 12 and has a circular section. Further, each orifice 20 receives a threaded bushing 22. Further, each orifice 20 consists of an inner segment 23 opening onto the inner face 19A of the plate 12 and of an outer segment 24 opening onto the outer face 19B of the plate 12. The diameter of the inner segment 23 is less than the diameter of the outer segment 24. The inner segment 23 and the outer segment 24 are coaxial and their junction is achieved on an edge 25, substantially orthogonal to the axis of both segments.

The threaded bushing 22 is a substantially cylindrical steel bushing, with a section adapted to its introduction into the orifice 20. The bushing 22 has a central threaded conduit 26 opening at one first end, as well as a shoulder 28 and a tightening head 29 at a second end. The length of the threaded central conduit 26 is at least equal to the thickness of the plate 12, i.e. at least equal to the distance between the inner 19A and outer 19B faces at the orifice 20.

Figure 2:
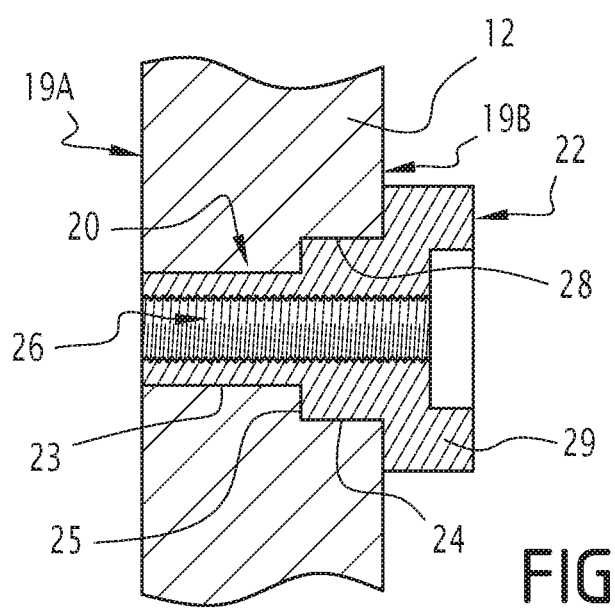
FIG. 2 is a sectional view of a portion of a plate of the frame of FIG. 1 receiving a threaded bushing.

The bushing 22 is engaged into the orifice 20 on the side of the outer face 19B, in order to place the shoulder 28 of the bushing 22 so as to be supported on the junction edge 25 between the inner segment 23 and the outer segment 24 of the orifice 20, as illustrated in FIG. 2.

Each bar 14 is of the drawer type, with a circular section and is made in steel. Further, the bar 14 has two threaded ends 30, each end 30 being engaged into the threaded central conduit 26 of a bushing 22.

Figure 3:
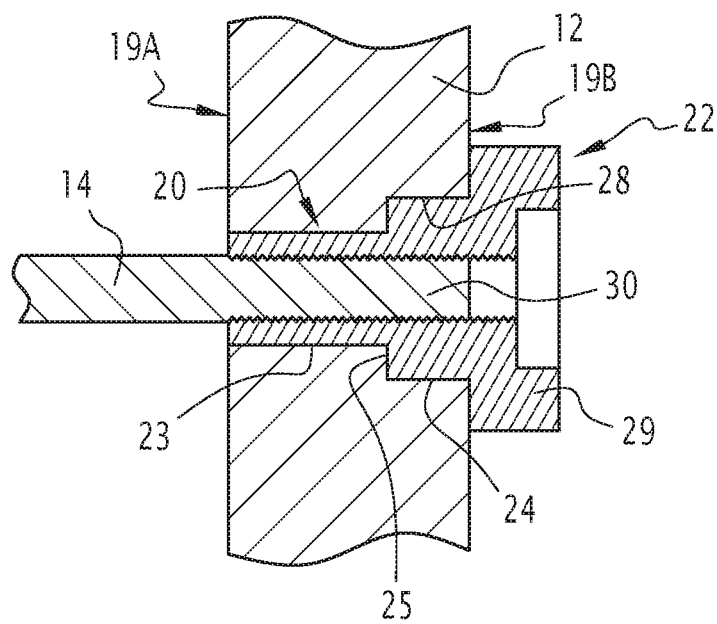
FIG. 3 is a sectional view of the threaded bushing of FIG. 2 receiving a steel bar.

Advantageously, the length of the threading of the engaged end 30 into the threaded bushing 22 is at least equal to the length of the central conduit 26 so as to make the end 30 of the bar 14 flush with the outer face 19B of the plate 12, as illustrated in FIG. 3.

Each end 30 of each bar 14 is thus screwed into the threaded central conduit 26 of one of the threaded bushings 22, said bushing being blocked in the orifice 20 by interaction of the shoulder 28 of the bushing 22 with the outer segment 24.

Figure 4:
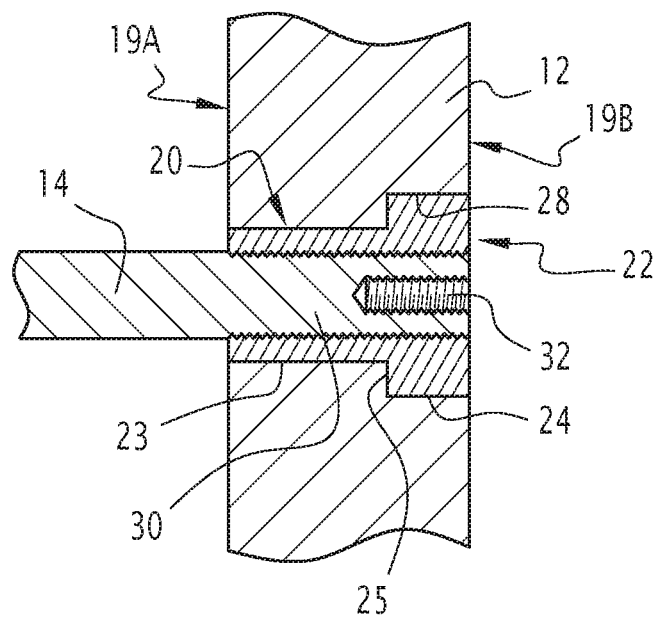
FIG. 4 is a sectional view of the threaded bushing of FIG. 2, the head of which has been leveled.

The tightening head 29 of each threaded bushing 22 is leveled so as to have the threaded bushing 22 and the end 30 of the bar 14 be flushed with the outer face 19B of the plate 12, as illustrated in FIG. 4.

Advantageously, each end 30 of at least one of the bars 14 has a threaded aperture 32 pierced in the bar 14, as illustrated in FIG. 4. This threaded aperture 32 is able to receive a screw for attaching an end flange closing the circular aperture of the plate 12 and thereby protecting the rotor contained in the frame 10.

The frame 10 of the example illustrated in FIG. 1 thereby comprises two plates 12 each including eight orifices 20 distributed pair wise located at the corners of the plate 12. The frame 10 also includes eight bars 14 connecting both plates 12, the eight bars 14 being substantially parallel with each other and distributed around the side walls 16. Advantageously, the side walls 16 have longitudinal conduits through which pass the bars 14, as illustrated in FIG. 1.

A method for manufacturing the frame 10 will now be described.

This method includes the following preliminary steps:
molding of two plates 12 in cast iron, each having an inner face 19A and an outer face 19B;
piercing at least one orifice 20 in the plates 12 and piercing an outer segment 24 at each orifice 20, opening onto the outer face 19B of the plate 12;
providing at least one steel bar 14 having two threaded ends 30;
providing at least one threaded bushing 22 in steel able to be placed in the orifice 20, having a threaded conduit 26 at a first end, as well as a shoulder 28 and a tightening head 29 at the other end;

Both plates 12 are then positioned on both sides of the side walls 16. Each orifice 20 receives a threaded bushing 22, introduced from the side of the outer face 19B of the plate 12, the shoulder 28 of the bushing 22 cooperating with the outer segment 24 of the orifice 20. Each end 30 of each bar 14 is engaged into a threaded bushing, and the tightening of each end 30 in the threaded conduit 26 of each bushing 22 ensures the clamping of both plates 12 on each side of the side walls 16.

According to an advantageous embodiment, the outer faces 19B of the plates 12 are then flattened by leveling of the tightening heads 29 of the threaded bushings 22, by removing the excess material in order to have at the outer face 19B the threaded bushings 22 and the ends 30 flushed with the bars 14 in steel.

The method finally includes a step for piercing a threaded aperture 32 in each end 28 of each bar 14, the threaded aperture 32 subsequently receiving a screw for attachment of an end flange.

The invention claimed is:

1. A motor stator frame comprising:
two plates in cast iron;
at least one steel bar connecting both plates, each bar having two threaded ends; and
at least one threaded bushing,
wherein each of the plates comprises at least one orifice being used as a seat for each threaded bushing, the threaded ends of each bar being engaged into the threaded bushings,
wherein each threaded bushing comprises a central threaded conduit, a length of the threaded central conduit being at least equal to a distance between an inner face and an outer face of the plate around the at least one orifice.

2. The frame according to claim 1, wherein each orifice of each plate in cast iron is a through-orifice and opens onto an inner face and an outer face of the plate.

3. The frame according to claim 2, wherein each orifice includes an inner segment opening onto the inner face of the plate and an outer segment opening onto the outer face of the plate, the inner segment having a diameter of less than the diameter of the outer segment, and the threaded bushing engaged into the orifice having a complementary shoulder of the orifice.

4. The frame according to claim 1, wherein each threaded bushing is flushed with an outer face of the plate including the orifice.

5. The frame according to claim 4, wherein each end of each bar is flushed with the outer face.

6. The frame according to claim 1, wherein each end of each bar has a threaded orifice receiving a screw for attaching an end flange.

7. A method for manufacturing a motor stator frame, comprising the following steps:
- providing two plates in cast iron, having at least one orifice;
- providing at least one steel bar having two threaded ends;
- providing threaded bushings, the threaded bushings having an outer conduit;
- inserting one of the threaded bushings in each orifice of each plate; and
- screwing each threaded end of each bar into one of the threaded bushings placed in one of the orifices of one of the plates.

8. The manufacturing method according to claim 7, comprising a step of piercing an outer face of each plate in order to form an outer segment at each orifice, said outer conduit being able to cooperate with a shoulder of each threaded bushing maintaining said threaded bushing in place.

9. The manufacturing method according to claim 8, comprising a step for leveling a tightening head of each threaded bushing in order to make the threaded bushing and the end of the bar flush with the outer face of the plate.

10. The manufacturing method according to claim 9, comprising a step of piercing a threaded orifice receiving a screw for attaching an end flange in each end of at least one bar.

* * * * *